455-605 AU 263 EX

4/8/86 XR 4,581,730

United States Patent [19]

Ozeki et al.

[11] Patent Number: 4,581,730

[45] Date of Patent: Apr. 8, 1986

[54] OPTICAL INSTRUMENTATION METHOD AND DEVICE

[75] Inventors: Takeshi Ozeki; Taro Shibagaki; Hiroyuki Ibe, all of Kawasaki, Japan

[73] Assignee: Agency of Industrial Science & Technology, Ministry of International Trade & Industry, Tokyo, Japan

[21] Appl. No.: 580,146

[22] Filed: Feb. 14, 1984

[30] Foreign Application Priority Data

Feb. 18, 1983 [JP] Japan .................................. 58-24732

[51] Int. Cl.[4] .............................................. H04B 9/00

[52] U.S. Cl. ...................................... 370/2; 350/96.15; 455/605; 455/617

[58] Field of Search ....................................... 370/1–4; 350/96.15; 455/610, 611, 605, 617

[56] References Cited

U.S. PATENT DOCUMENTS 3,272,988 9/1966 Bloom et al. .......................... 370/2

4,215,576 8/1980 Quick et al. ......................... 356/365

4,302,835 11/1981 McMahon .............................. 370/4

4,416,013 11/1983 Tobin .................................. 372/18

OTHER PUBLICATIONS

"Temperature Sensor Using Constant Polarization Fiber" from '82 Nat'l Conf. Record on Optical & Radio Wave Electronics, The Institute of Electr. & Commun. Engineers of Japan (8/82).

*Primary Examiner*—Joseph A. Orsino, Jr.

*Assistant Examiner*—Timothy K. Greer

*Attorney, Agent, or Firm*—Spensley Horn Jubas & Lubitz

[57] ABSTRACT

In an optical instrumentation system, sensor units are solely constructed optically and each sensor unit comprises a subcarrier generating section for causing periodic changes in the light intensity of light wave from a light source corresponding to the wavelength sweep of the light source to generate a subcarrier, and a sensor section for modulating the subcarrier by detected information, and at the receiving end of the system a demultiplexing section is provided for demultiplexing detected information by selecting the subcarrier.

14 Claims, 6 Drawing Figures

OPTICAL INSTRUMENTATION METHOD AND DEVICE

BACKGROUND OF THE INVENTION

1. Field of the Invention

The present invention relates to the field of optical instrumentation methods and devices to be employed in industrial instrumentation systems and the like, and in particular, to method and device for detecting and transmitting information only by optical means.

2. Description of the Prior Art

An industrial instrumentation system is generally configured by connecting numbers of sensors to process controllers. In such industrial instrumentation systems, the number of cables to be employed for transmitting data detected by individual sensors inevitably becomes very large as the system scale becomes enormous. The problems arisen from the great number of the cables has become a serious technical theme to be solved.

For this reason, it has been desired to establish a sensor network system wherein cables from a plurality of sensors are connected to a single cable and information detected by each sensor is tramsmitted through a single cable. For overall system safety, it has also been desired that the transmission system including sensors should be explosion proof. Furthermore, enhancement of system reliability has been desired.

From the requirements mentioned above, a sensor system employing only optical means is drawing attention. As such an optical sensor system employing optical means, there has been known an optical sensor system wherein a plurality of sensors are connected in parallel and information detected by each sensor is transmitted in time shared multiplex manner. FIG. 1 shows the basic configuration of such conventional system, in which S1, S2, and S3 represent optical switches which perform connection and disconnection of the optical path corresponding, for example, to the ON/OFF of the valve (not shown), and $\tau 2$ and $\tau 3$ represent delay optical fibers. When a light pulse is sent from the process controller (not shown) through l1, the information representing ON/OFF of the optical switches S1–S3 multiplexed in a time-shared manner by means of the delay optical fiber $\tau 2$, $\tau 3$ and then collected to transmit through a single line l2.

However, due to the fact that the delay time of an average delay optical fiber is about 1 msec/200 m, and that a long delay fiber cannot be adopted because of economical reason, the time slot to be assigned to each sensor becomes short, and as a result, such systems have not been adaptable to a high precision analog sensor.

On the other hand, there has been a conventional system of another type wherein digital sensors are employed as high precision sensors. In this case, however, since there is no means to multiplex each digit information to transmit it to the process controller, such a system must transmit each digit information through respective transmission line, presenting a problem of practicability.

SUMMARY OF THE INVENTION

Accordingly, the present invention is directed to eliminate the above-mentioned problems and an object of the present invention is to provide an optical instrumentation system making possible high precision sensing in the frequency division multiplex manner based on the new idea of optical transmission of detected information.

The present invention is directed to the optical instrumentation method and device in which detection and transmission of information are carried out solely by the optical means, and for the transmission of detected information the technique of frequency division multiplex are employed.

According to the present invention, there is provided in each sensor unit a subcarrier generating unit for causing a periodic change in the light intensity of a light wave to be transmitted through the sensor unit, and the periodic change of the light intensity is utilized as a subcarrier to carry detected information. In this case, the sensor unit is solely constructed by optical means and therefore has no power source. As a light source, a wavelength sweep laser is employed and the generation of the subcarrier in the subcarrier generating unit required for the frequency division multiplex is accomplished by the wavelength sweep of the light source. As such subcarrier generating unit, an optical element having transmission characteristic varying according to the wavelength (or the lightwave frequency), typically a constant polarizing fiber or an interferometer, may be used.

Another object of the present invention is to provide information detected by and sent from each sensor is carried by subcarriers of mutually different frequencies to perform multiplex transmission in frequency division manner. At the receiving end of the process controller, each sensor information is demultiplexed through the frequency separation by means of a variable transversal filter or a high speed Fourier transform circuit.

Further, according to the present invention, technical difficulties encountered by prior art time shared multiplex system can be avoided by constructing the system in such a way that different information detected at a plurality of sensor units arranged in series is carried by subcarriers of mutually different frequencies in frequency division multiplex manner, realizing a high precision optical analog sensor system.

Alternatively, by using a plurality of sensor units whose relative sensitivities are arranged to 2k (k=0, 1, 2, . . . ), and by carrying each digit information of the detected information on the subcarrier, an optical digital sensor system of frequency dividing multiplex transmission can be realized.

DESCRIPTION OF THE PREFERRED EMBODIMENT

Before describing embodiments of the present invention, the principle of the subcarrier generating unit will be explained.

Figure 1:
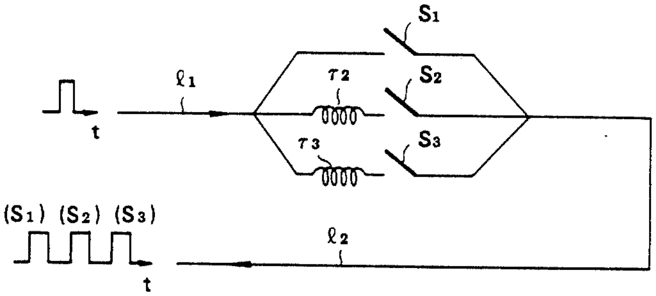
FIG.1 (PRIOR ART)
FIG. 1 shows the basic configuration of a prior art time shared multiplex optical sensor system.
Figure 2:
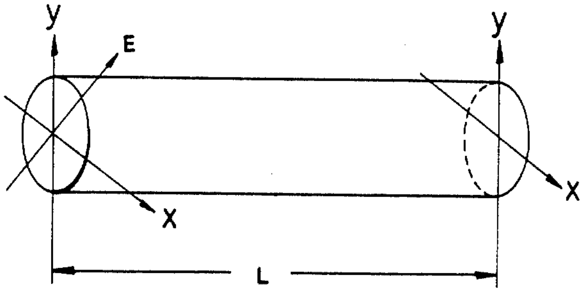
FIGS. 2 and 3 show typical configurations of a subcarrier generating unit of the present invention.

As a subcarrier generating units which causes periodic change in the light intensity of the light wave by performing wavelength sweep on the light source, a constant polarizing fiber may be adopted. As shown in FIG. 2, when the constant polarizing fiber receives a light wave having the electric field E which lies at 45 degrees with respect to two main axes x and y thereof, the phase shift Ψ relative to the two main axes at the output end of the fiber can be given by the following expression.

$$\Psi=\tfrac{1}{2}(\beta x-\beta y)L \quad (1)$$

where βx and βy are phase constants of the light wave whose main polarization directions are in the respective main axis directions, and L is the length of the constant polarizing fiber. The phase constants βx and βy may be expressed as follows using equivalent refractive indices Nx and Ny:

$$\begin{cases} \beta x = \dfrac{2\pi}{\lambda} Nx \\ \beta y = \dfrac{2\pi}{\lambda} Ny \end{cases} \quad (2)$$

Accordingly, the amount of variation ΔΨ of the phase shift Ψ with respect to a small change Δλ of the wavelength λ may be given as follows:

$$\Delta\Psi = -\frac{\Delta\lambda}{\lambda}\cdot\frac{2\pi}{\lambda}(Nx-Ny)L + \frac{2\pi L}{\lambda}\cdot\frac{\partial}{\partial\lambda}(Nx-Ny)\Delta\lambda \quad (3)$$

In an ordinary constant polarizing fiber, the second term of the right side of the above expression may be neglected, since it is vary small. Since this phase shift occurs with a period of 2π, i.e., as a frequency f $$f = -\frac{\Delta\lambda}{\lambda}(Nx-Ny)L \quad (4)$$

as the rotation of the polarization state, this can be utilized as a subcarrier.

Figure 3:
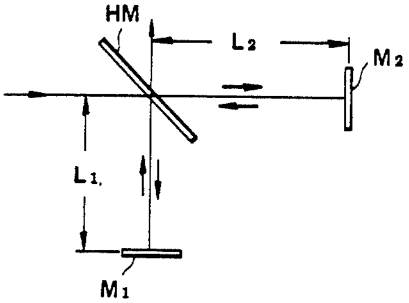

Michelson interferometer and Mach-Zehander interferometer may also adopted as a subcarrier generating unit since they cause light intensity of the light source to change periodically as a result of the interference of two waves when wavelength sweep is performed. Referring to FIG. 3, an interferometer consists of mutually orthogonal mirrors M1 and M2 and a half mirror HM. The effect of interference by the interferometer is expressed as follows:

$$E = \frac{1}{\sqrt{2}}\left\{1+\exp\left(j\frac{2\pi}{\lambda}\Delta L\right)\right\} \quad (5)$$

thus, $$|E|^2 = 1+\cos\left(\frac{2\pi}{\lambda}\Delta L\right) \quad (6)$$

where ΔL is the length defference between two optical pathes ($=L_1-L_2$).

By such means as mentioned above subcarrier can be generated at the sensor unit, and the frequency of the subcarrier (the rate of transmission characteristics change caused by wavelength sweep) can be set arbitrary by chosing the fiber length and the difference optical path lengths.

Figure 4:
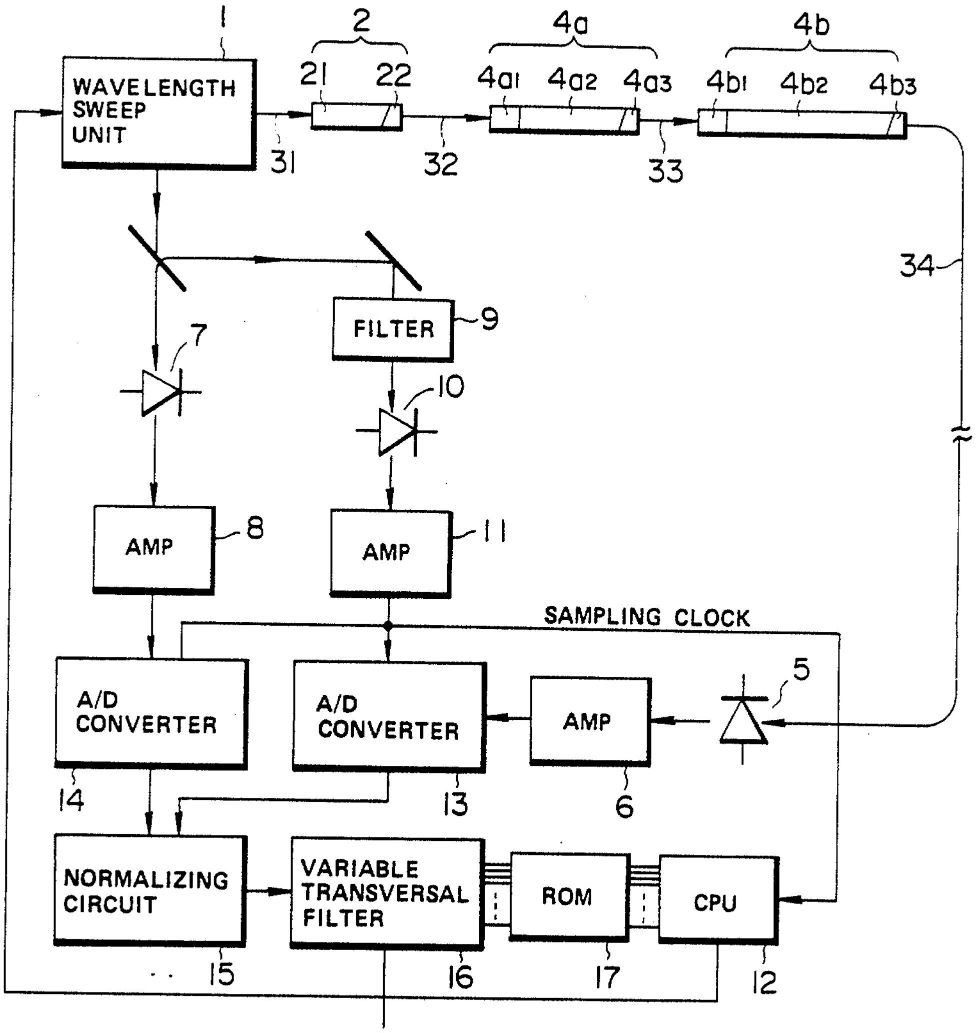
FIG. 4 shows the block diagram of an embodiment of the temperature sensor system according to the present invention.

FIG. 4 shows the system configuration of an embodiment wherein a constant polarizing fiber is used in the subcarrier generating unit. In FIG. 4, there is provided a wavelength sweep semiconductor laser unit 1 as a light source. This laser unit 1 is a distributed feedback type laser typically employing a diffraction grating which is driven by a pulse current whose repetition time is sufficiently smaller than the thermal time constant, and sweeps the oscillation wavelength by the temperature rise caused by the current injection. That is, the semiconductor laser unit 1 whose thermal resistance is 100° C.W has a temperature rise of 20° C. when the power consumption is around 200 mW, and around 20 Å wavelength sweep is possible.

The output of the wavelength sweep semiconductor laser unit 1 is applied to a pilot signal generator 2 through a transmission fiber 31 (or directly). This pilot signal generator 2 is comprised of a constant polarizing fiber 21 and a light detecting element 22. The constant polarizing fiber 21 has polarization plane which is set such that the output beam of the semiconductor laser unit 1 enters at 45 degrees with respect to its refractive index main axis in the state of a linear polarized wave. The light detecting element 22 is likewise set at 45 degrees with respect to the refractive index main axis of the constant polarizing fiber 21. Accordingly, in this pilot signal generator 2 the polarization state turns according to the wavelength sweep, and a periodic change of fp cycle in light intensity occurs within the wavelength sweep width Δλ.

The output light wave of the pilot signal generator 2 is transmitted to a first sensor unit 4*a* via a transmission fiber 32. The transmission fiber 32 is a constant polarizing fiber, whose refractive index main axis is aligned with the linear polarization plane determined by the light detecting element 22, thereby restricting unnecessary rotation of the polarization plane.

Figure 5:
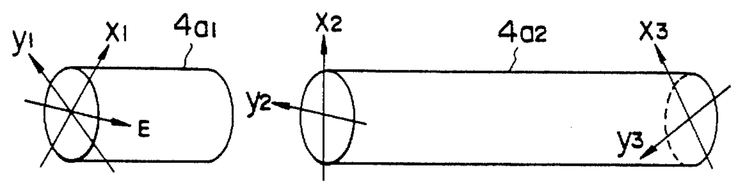
FIG. 5 is a view illustrating the operation of the sensor unit.

The first sensor unit 4*a* is comprized of a constant polarizing fiber $4a_1$ serving as a temperature sensor unit, a constant polarizing fiber $4a_2$ serving as a subcarrier generator, and a light detecting element $4a_3$. The phase constant difference in the directions of two mutually orthogonal refractive index main axes x1 and y1 of the constant polarizing fiber $4a_1$ changes according to the temperature, with the rate of this change being approximately 2π/2m/C.°. For example, when the fiber is 2 meters long, a temperature change of 1° C. results in a phase difference change of about 2π. The constant polarizing fiber $4a_1$ is connected while turned +45 degrees with respect to the main axis of the transmission fiber 32, and the constant polarizing fiber $4a_2$ is connected while further turned +45 degrees. The light detecting element $4a_3$ is typically made by cutting the end surface of the constant polarizing fiber $4a_2$ to Brewstar's angle and then forming a dielectric multilayer film thereon after grinding the cut surface. The light detecting element $4a_3$ is likewise connected while turned +45 degrees with respect to the constant polarizing fiber $4a_2$. FIG. 5 shows these connection in an enlarged view.

The transmittivity of the first sensor unit 4*a* is as follows. When the electric field E of the incident light wave to the first sensor unit 4*a* is E, the field vector E3 of the outgoing light wave with respect to the electric field E is given by the following expressions:

$$\begin{bmatrix} Ex \\ Ey \end{bmatrix}_3 = \tag{7}$$

$$\frac{1}{2\sqrt{2}}\begin{bmatrix} 1 & 1 \\ -1 & 1 \end{bmatrix}\begin{bmatrix} e^{j\psi 2} & 0 \\ 0 & e^{-j\psi 2} \end{bmatrix}\begin{bmatrix} 1 & 1 \\ -1 & 1 \end{bmatrix}\begin{bmatrix} e^{j\psi 1} & 0 \\ 0 & e^{j\psi 1} \end{bmatrix}\begin{bmatrix} 1 & 1 \\ -1 & 1 \end{bmatrix}\begin{bmatrix} 1 \\ 0 \end{bmatrix}E$$

$$= \frac{E}{\sqrt{2}}\begin{bmatrix} j\sin(\psi_1 + \psi_2) - \cos(\psi_1 - \psi_2) \\ -j\sin(\psi_1 - \psi_2) - \cos(\psi_1 + \psi_2) \end{bmatrix}$$

Therefore $$|Ex|_3{}^2 = \frac{E^2}{2}\{\sin^2(\psi_1 + \psi_2) + \cos^2(\psi_1 - \psi_2)\} \tag{8}$$

$$= \frac{E^2}{2}\{1 + \sin 2\psi_1 \sin 2\psi_2\}$$

where $2\psi_1$ is the phase difference caused by the constant polarizing fiber $4a_1$ serving as a temperature sensor, and is nearly proportional to the temperature, and $2\psi_2$ is the phase difference caused by the constant fiber $4a_2$ serving as a subcarrier generating unit.

The constant polarizing fiber $4a_2$ serving as the subcarrier generator is also affected by the temperature, but the effect by the temperature is sufficiently small. In order to explain this, using the following equation:

$$f_1 = -\frac{\Delta\lambda}{\lambda}\cdot(N_x - N_y)L \tag{9}$$

as the temperature characteristic of phase shift to the wavelength sweep, the temperature change of the subcarrier frequency can be expressed as follows.

$$\frac{1}{f_1}\frac{df_1}{dT} = \frac{1}{(N_x - N_y)L}\cdot\frac{d}{dT}\{(N_x - N_y)L\} \tag{10}$$

That is, $$\frac{1}{f_1}\frac{df_1}{dT} = \frac{1}{L}\frac{dL}{dT} + \frac{1}{N_x - N_y}\frac{d}{dT}(N_x - N_y) \tag{11}$$

In the case of quartz fiber group, both dL/dT and $$\frac{d(N_x - N_y)}{d}$$

are less than $10^{-5}$ which is sufficiently small.

Accordingly, the transmittivity $F_1(x)$ of the first sensor unit 4*a* can be expressed as follows:

$$F_1(x) = \tfrac{1}{2}\{1 + \sin 2\psi_1(T)\cdot\sin(2\pi f_1 x + \phi_1)\} \tag{12}$$

where x ($0 \leq x \leq 1$) is a wavelength sweep variable.

That is, in the first sensor unit 4*a* the subcarrier of the frequency $f_1$ is subjected to amplitude modulation of sin $2\psi_1(T)$ by the temperature T, and sensor information is carried by the subcarrier as a result.

The output light wave of the first sensor unit 4*a* is transmitted to a second sensor unit 4*b* through a transmission fiber 33. Similar to the transmission fiber 32, this transmission fiber 33 is a constant polarizing fiber, and prevents unnecessary rotation of the polarization plane by aligning its refractive index main axis with the linear polarization plane determined by the light detecting element $4a_3$.

The second sensor unit 4*b* is for the temperature measurement at another measuring point, and is comprised of a constant polarization fiber $4b_1$ serving as a temperature sensor unit, a constant polarizing fiber $4b_2$ serving as a subcarrier generating unit, and a light detecting element $4b_3$. Each component has the polarization plane whose connections to each other are made in a similar manner to that of the first sensor unit 4*a*. If the subcarrier freuqency is $f_2$, the transmittivity $F_2(x)$ of the second sensor unit 4*b* can be expressed as follows:

$$F_2(x) = \tfrac{1}{2}\{1 + \sin 2\psi_2(T)\cdot\sin(2\pi f_2 x + \phi_2)\} \tag{13}$$

In the same manner, when output light waves of the second sensor unit 4*b* are connected to the sensor units of the following stages one after another through the transmission fiber 34, and when the total number of the sensor units is N with the pilot signal generator 2 included the following becomes the waveform of the output light wave at the wavelength sweep variable x ($0 \leq x \leq 1$).

$$\underset{\text{Total}}{F(x)} = \overset{N}{\underset{m=0}{\pi}} \tfrac{1}{2}\{1 + \sin 2\psi m(T)\cdot\sin(2\pi f_m x + \phi_m)\} \tag{14}$$

From the above equation, the Fourier expansion coefficients are obtained by using the following formulas, thus the separation of each sensor information is performed.

$$(-1)^{(n-1)/2}2^{n-1}\sin A_1 \sin A_2 \ldots \sin A_n = \tag{15}$$

$$S_n - S_{n-1} + S_{n-2} - \ldots + (-1)^{(n-1)/2}S_{(n+1)/2} \ (n\text{: odd number})$$

$$(-1)^{n/2}2^{n-1}\sin A_1 \sin A_2 \ldots \sin A_n = \tag{16}$$

$$C_n - C_{n-1} + C_{n-2} - \ldots + \frac{(-1)^{n/2}}{2}C_{n/2} \ (n\text{: even number})$$

where $$S_{n-m} = \Sigma\sin(A_1 + A_2 + \ldots + A_{n-m} - A_{n-m+1} - \ldots - A_n) \tag{17}$$

$$C_{n-m} = \Sigma\cos(A_1 + A_2 + \ldots + A_{n-m} - A_{n-m+1} - \ldots - A_n) \tag{18}$$

Sm is sum of sine of angles for all combinations generated in such a manner that as many as m angles of the total of n angles $A_1, A_2, \ldots A_n$ are given plus (+) sign and the rest (n−m) are given minus (−) sign, while $C_m$ is sum of cosine of angles for all combinations generated in such a manner that as many as m angles of the total of n angles $A_1, A_2, \ldots A_n$ are given plus (+) sign and the rest (n−m) are given minus (−) sign.

When the subcarrier frequency $f_m$ is set as shown in the following table, the separation calculation of the frequency division multiplex becomes easy. That is, it becomes the condition that the number of terms containing the subcarrier frequency $f_m$ is limited to one.

| | $f_1$ | $f_2$ | $f_3$ | $f_4$ | $f_5 \ldots f_N$ |
|---|---|---|---|---|---|
| N = 2 | 1 | 3 | | | |
| 3 | 1 | 3 | 8 | | |
| 4 | 1 | 3 | 8 | 21 | |
| 5 | 1 | 3 | 8 | 21 | 34 |
| . | . | . | . | . | . |

-continued

| | $f_1$ | $f_2$ | $f_3$ | $f_4$ | $f_5 \ldots f_N$ |
|---|---|---|---|---|---|
| . | . | . | . | . | . |
| . | . | . | . | . | . |
| N | 1 | 3 | 8 | 21 | $34 \ldots \sum_{i=1}^{N-1} f_i + f_{N-1}$ |

Fourier coefficients $a_m$ and $b_m$ are defined as follows:

$$a_m = \int_0^1 \frac{2^N F(x) \sin 2\pi f_m x dx}{\text{Total}} \quad (19)$$

$$b_m = \int_0^1 \frac{2^N F(x) \cos 2\pi f_m x dx}{\text{Total}} \quad (20)$$

Then, $$a_m = \sin 2\psi_m(T) \int_0^1 \sin(2\pi f_m x + \phi_m) \sin 2\pi f_m x dx \quad (21)$$

$$= \tfrac{1}{2} \sin 2\psi_m(T) \int_0^1 \{\cos\phi_m - \cos(4\pi f_m x + \phi_m)\} dx$$

$$= \tfrac{1}{2} \sin 2\psi_m(T) \cos\phi_m$$

Similarly, $$b_m = \tfrac{1}{2} \sin 2\psi_m(T) \sin\phi_m \quad (22)$$

Accordingly, $$\sin 2\psi_m(T) = \sqrt{a^2_m + b^2_m} \left(0 < 2\psi_m(T) < \frac{\pi}{4}\right) \quad (23)$$

From the above equation, $\psi_m(T)$, that is temperature T, can be obtained.

There are several methods for obtaining the Fourier coefficients. Typical of those methods are:

(1) The wavelength sweep output waveform F(x) is A/D converted and then subjected to high speed Fourier transform, and (2) In the variable transversal filter, weighting coefficient is set typically to sin ($2\pi f_m x$), digitized data of F(x) is incorporated, and the Fourier coefficient is obtained.

FIG. 4 is an example of system configuration employing the latter method. That is, the output light wave which passed through the sensor units 4*a*, 4*b*, . . . and then transmitted through a single fiber is detected at a photodiode 5, and is amplified at an amplifier 6. On the other hand, part of the output of a semiconductor laser unit 1 is detected at a photodiode 7 and amplified at an amplifier 8, the resultant signal being taken as a reference signal. In addition, from a portion of the output of the semiconductor laser unit 1 the wavelength component output corresponding to the subcarrier frequency at each sensor unit is selected by a wavelength sweep detection filter 9 and detected at a photodiode 10, and a sampling clock is generated by passing the detected wavelength component through an amplifier/waveform shaping circuit 11. By the above operations, if the wavelength sweep in the semiconductor laser unit 1 is a monotone function with respect to time, Fourier coefficients will be easy to obtain. Then, this sampling clock is fed to a CPU 12 as a timing pulse, the outputs of the amplifiers 6 and 8 are digitized by A/D converters 13 and 14 respectively, the output signal at each sampling point is normalized at a normalization circuit 15 and is fed to a variable transversal filter 16, and a weighting coefficient, i.e., tap gain, is set by a ROM 17. By the above operations, the Fourier coefficients $a_m$ and $b_m$ are obtained, and the temperature at each measuring point can be obtained accordingly.

The embodiment so far described is for transmitting a plurality of detected information at a plurality of measuring points in the frequency division multiplex manner. However, the present invention is also applicable to the case where a single detected information is digitized and the resultant each digital information is transmitted by means of the frequency division multiplex and demultiplexed. In this case, a plurality of sensor units are provided at a single measuring point, and digital information is frequency division multiplexed by appropriately selecting the sensor sensitivity according to the arrangement of $2^k$ (k=0, 1, 2, . . . ). A typical embodiment of such case will be described below.

Figure 6:
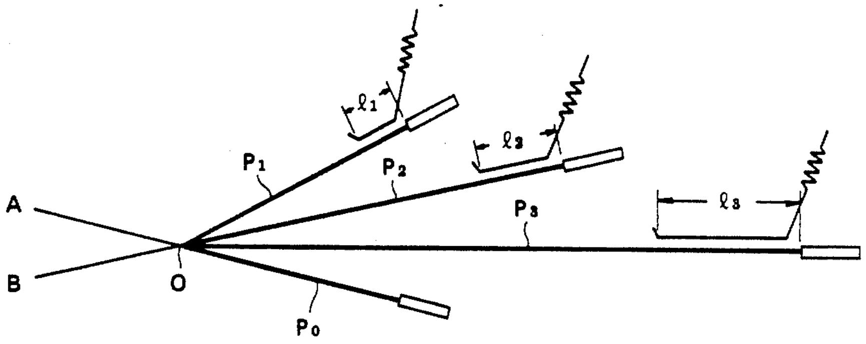
FIG. 6 shows the configuration of the sensor unit of another embodiment.

FIG. 6 is a schematic view showing the configuration of the sensor unit in which a reference symbol A denotes an input port, and B an output port. A branching-combiner is provided at a point O, and a ray from the input port A are branched to ports $P_0$, $P_1$, and $P_3$ at a fixed ratio. The rays are reflected at reflection points of the ports $P_o$, $P_1$, $P_2$ and $P_3$, and are combined at the point O, the output light wave being obtained at the output port B. $P_0$ denotes a reference phase generating port. When returning to the point O after entering the port $P_0$, the combined wave electric field $E_0$ is expressed by $$E_0 = a_0^2 \exp\left(j\frac{2\pi}{\lambda} \cdot 2\tilde{L_0}\right) \quad (24)$$

where $L_0$ is the equivalent optical path length of the port $P_0$.

The ports $P_1$, $P_2$ and $P_3$ comprise a sensor unit for loading each of the digitized detected information onto the subcarrier. The ports $P_1$, $P_2$ and $P_3$ have respective reflection points through distribution connection line portions of respective lengths $l_1$, $l_2$ and $l_3$. When the respective equivalent optical path lengths are assumed to be $L_1$, $L_2$, and $L_3$ taking into account the phase constant change of the respective distribution connection line portions, each light wave electric field when returning to the point O can be given as follows:

$$E_1 = a_1^2 \cos^2\theta_1 \exp\left(j\frac{2\pi}{\lambda} \cdot 2\tilde{L_1}\right) \quad (25)$$

$$E_2 = a_2^2 \cos^2\theta_2 \exp\left(j\frac{2\pi}{\lambda} \cdot 2\tilde{L_2}\right)$$

$$E_3 = a_3^2 \cos^2\theta_3 \exp\left(j\frac{2\pi}{\lambda} \cdot 2\tilde{L_3}\right)$$

Accordingly, when the number of the sensor units is N, the output light wave electric field $E_t$ can be given as follows generally:

$$E_t = \quad (26)$$

-continued $$a_0^2\exp\left(j\frac{2\pi}{\lambda}\cdot 2L_0^{\sim}\right) + \sum_{m=1}^{N} a_m^2\cos^2\theta_m\exp\left(j\frac{2\pi}{\lambda}\, 2L_m^{\sim}\right)$$

Now, if the absolute phase of the field $E_t$ is not considered and $a_0=1$ is assumed, $$E_t = 1 + \sum_{m=1}^{N} a_m^2\cos^2\theta_m\exp(j\psi_m) \quad (27)$$

where $$\psi_m = \frac{4\pi}{\lambda}(L_m^{\sim} - L_0^{\sim})$$

$$|E_t|^2 = \left(1 + \sum_{m=1}^{N} a_m^2\cos^2\theta_m\cos\psi_m\right)^2 + \left(\sum_{m=1}^{N} a_m^2\cos^2\theta_m\sin\psi_m\right)^2 \quad (28)$$

$$= 1 + \sum_{m=1}^{N} a_m^4\cos^4\theta_m + \sum_{m=1}^{N} a_m\cos^2\theta_m\cos\psi_m + \sum\sum_{m\neq n} a_m^2a_n^2\cos^2\theta_m\cos^2\theta_n(\cos\psi_m\cos\psi_n + \sin\psi_m\sin\psi_n)$$

Therefore, $$|E_t|^2 = \left(1 + \sum_{m=1}^{N} a_m^4\cos^4\theta_m\right) + 2\sum_{m=1}^{N} a_m^2\cos^2\theta_m\cos\psi_m + \tfrac{1}{2}\sum\sum_{m\neq n} a_m^2a_n^2\cos^2\theta_m\cos^2\theta_n\cdot\cos(\psi_m - \psi_n) \quad (29)$$

Similar to the aforementioned embodiment, when the wavelength sweep of the light source ($\lambda\rightarrow\lambda+\Delta\lambda_s$) is performed, the change $\Delta\psi_m$ of the phase $\psi_m$ becomes $$\Delta\psi_m \approx -\psi_m\cdot\frac{\Delta\lambda_s}{\lambda} = -2\pi\cdot\frac{2(L_m^{\sim} - L_0^{\sim})}{\lambda}\cdot\frac{\Delta\lambda_s}{\lambda}\cdot x \quad (30)$$

Here, the phase rotation rate $f_m$ is defined as follows:

$$f_m = \frac{2(L_m^{\sim} - L_0^{\sim})}{\lambda}\cdot\frac{\Delta\lambda_s}{\lambda} \quad (31)$$

This rate is proportional to the frequency when the wavelength is changed in the range of $0\leqq x\leqq 1$.

The arrangement of the phase rotation rate $f_m$ should be one free of generating the same frequency in the sum/difference frequency generation in Equation (28). For example, the arrangement is as follows:

| | $f_1$ | $f_2$ | $f_3$ | $f_4 \ldots fM$ |
|---|---|---|---|---|
| N = 2 | 1 | 3 | | |
| 3 | 1 | 3 | 5 | |
| 4 | 1 | 3 | 5 | 7 |
| . | . | . | . | . |
| . | . | . | . | . |
| . | . | . | . | . |
| M | 1 | 3 | 5 | 7 . . . (2M − 1) |

In this manner, the frequency arrangement is set, and Fourier expansion coefficient $A_m$ of $|Et|^2\equiv F(x)$ is obtained.

$$F(x) = \left(1 + \sum_{m=1}^{N} a_m^4\cos^4\theta_m\right) + 2\sum_{m=1}^{N} a_m^2\cos^2\theta_m\cos(2\pi f_m x) + \tfrac{1}{2}\sum\sum_{m\neq n} a_m^2a_n^2\cos^2\theta_m\cos^2\theta_n\cos 2\pi(f_m - f_n)x \quad (32)$$

$$A_m = \int_0^1 F(x)\cos 2\pi f_m x dx = a_m^2\cos\theta_m \quad (33)$$

Accordingly, if either "0" or "1" is assigned to each $A_m$ for the threshold value ($a_m^2/2$) and the change rate (sensitivity) for the detected value of $\theta_m$ is set at the ratio of $2^m$, a gray coded digital sensor is obtained.

In this embodiment, no normalization means of $A_m$ is provided in the coverage of the above description, and therefore, the system is affected by loss variation of the transmission line or light source variation. A satisfactory countermeasure for these variations is the addition of a reference port, assignment of a frequency $f_0$, and provision of a fixed Fourier expansion coefficient $A_0$ to be a normalization standard.

In addition, in the case of this embodiment, the temperature change rate of the phase rotation rate $f_m$ is given as follows:

$$\frac{1}{f_m}\frac{df_m}{dT} = \frac{1}{(L_m^{\sim} - L_0^{\sim})}\frac{d}{dT}(L_m^{\sim} - L_0^{\sim}) \quad (34)$$

which is in the range of from $10^{-6}$ to $10^{-4}$. Even if T=500° C., the temperature change rate is less than 5% which is sufficiently small and no problem is involved.

As described above with reference to the embodiment, the present invention enables the realization of an instrumentation system solely by the optical means which is capable of frequency division multiplex transmission.

What is claimed is:

1. An optical instrumentation system in which a light wave from a light source is transmitted by way of a plurality of sensor units and detected information from each of said sensor units is collected at a receiving end of the system, comprising:

means for sweeping said light source repetitively through a range of optical frequencies, each of said sensor units comprising a subcarrier generating section for causing periodic changes in the light intensity of said transmitted light wave corresponding to the changing optical wave length as said light source is swept through said range of optical frequencies, thereby to generate a subcarrier, and a sensor section for modulating said subcarrier by detected information, and said receiving end being provided with a demultiplexing section provided for demultiplexing the detected information from each sensor section by selecting the corresponding subcarrier.

2. The optical instrumentation system of claim 1 wherein said subcarrier generating section is a constant polarizing fiber.

3. The optical instrumentation system of claim 1 wherein said subcarrier generating section is an interferometer.

4. The optical instrumentation system of claim 1 wherein said sensor unit comprises a first constant polarizing fiber serving as a temperature sensor unit, a second constant polarizing fiber serving as a subcarrier generating unit and a light detecting element, said first constant polarizing fiber being connected to a transmission fiber while rotated 45 degrees with respect to the refractive index main axis of said transmission fiber, and said second constant polarizing fiber being connected to said first constant polarizing fiber while rotated 45 degrees with respect to the refractive index main axis of said first constant polarizing fiber.

5. The optical instrumentation system of claim 4 wherein said light detecting element comprises a third constant polarizing fiber, the end surface of said third constant polarizing fiber being cut to a Brewstar's angle and ground on which a dielectric multilayer film is formed, said third constant polarizing fiber being connected to said second constant polarizing fiber while rotated 45 degrees with respect to the refractive index main axis of said second constant polarizing fiber.

6. The optical instrumentation system of claim 4 wherein said transmission fiber is a constant polarizing fiber.

7. The optical instrumentation system of claim 1 wherein said light source is a distributed feedback type laser employing a diffractive grating which is driven by a pulse current whose repetition period is sufficiently smaller than the thermal time constant, and sweeps the oscillation wavelength by the temperature rise resulting from current injection.

8. The optical instrumentation system of claim 1 wherein said plurality of the sensor units are arranged on the optical path in series corresponding to mutually different detected information, and said subcarrier generating sections generate mutually different subcarriers corresponding to each of said sensor units.

9. The optical instrumentation system of claim 8 wherein a pilot signal generator is further provided on said optical path.

10. The optical instrumentation system of claim 9 wherein said pilot signal generator comprises a first constant polarizing fiber and a light detecting element.

11. The optical instrumentation system of claim 1 wherein said plurality of the sensor units are disposed to detect a single information, and exhibit relative sensor sensitivities of $2^k$ where (K=0, 1, 2 . . . ).

12. An optical instrumention method wherein a light wave from a light source is transmitted by way of a plurality of sensor units and information detected by each of said sensor units is collected at a receiving end, comprising steps of;

sweeping said light source repetitively through a range of optical frequencies;

generating a subcarrier in each of said sensor units by causing periodic changes in the light intensity of said transmitted light wave corresponding to the changing wave length each time said light source is swept through said range of optical frequencies;

modulating each said subcarrier by said detected information at the corresponding sensor unit to perform multiplex transmission of said detected information; and demultiplexing the detected information from each sensor by selecting the corresponding subcarrier at said receiving end.

13. The optical instrumentation method of claim 12 wherein said plurality of sensor units are arranged in series along the optical path corresponding to each information detecting location and said step of generating subcarriers is a step for generating subcarriers of mutually different frequencies corresponding to the respective sensor units.

14. The optical instrumentation method of claim 12 wherein said plurality of sensor units are disposed to detect a single information, and exhibit relative sensor sensitivities of $2^k$ where (k=0, 1, 2 . . . ).

* * * * *